United States Patent

Beard

[11] Patent Number: 5,875,335
[45] Date of Patent: Feb. 23, 1999

[54] PARAMETER MARSHALING TECHNIQUES FOR DYNAMIC OBJECT-ORIENTED PROGRAMMING LANGUAGES

[75] Inventor: Patrick C. Beard, Danville, Calif.

[73] Assignee: Apple Computer, Inc., Cupertino, Calif.

[21] Appl. No.: 723,035

[22] Filed: Sep. 30, 1996

[51] Int. Cl.⁶ .............................. G06F 9/40; G06F 13/00
[52] U.S. Cl. ....................... 395/705; 395/704; 395/707; 395/708; 395/709
[58] Field of Search ...................................... 395/683, 682, 395/500, 702, 685, 673, 701, 703, 704–705, 707–710, 183.13, 183.14, 712, 684, 680, 200.31, 672; 707/3

[56] References Cited

U.S. PATENT DOCUMENTS

| | | | |
|---|---|---|---|
| 5,367,685 | 11/1994 | Gosling | 395/707 |
| 5,613,148 | 3/1997 | Bezviner et al. | 395/701 |
| 5,630,131 | 5/1997 | Palevich et al. | 395/701 |
| 5,692,183 | 11/1997 | Hapner et al. | 395/701 |
| 5,715,460 | 2/1998 | Acker et al. | 395/705 |

OTHER PUBLICATIONS

*The Java Virtual Machine Specification,* Sun Microsystems Computer Corporation, Aug. 21, 1995, pp. 1–84.

*Primary Examiner*—James P. Trammell
*Assistant Examiner*—Cuong H. Nguyen
*Attorney, Agent, or Firm*—Burns, Doane, Swecker & Mathis, L.L.P.

[57] ABSTRACT

When a method implemented in native compiled code is called from a object-oriented program, the parameters associated with that method are marshaled to convert them from the format of the object-oriented code into one which is appropriate for the compiled code. The marshaling of parameters is carried out in dependence upon the particular type of object with which the parameters are associated. When an aggregate object is marshaled, a pointer to the object is adjusted to point directly to variables for an instance of that object. When an array is marshaled, the pointer is adjusted to point to its individual elements.

16 Claims, 6 Drawing Sheets

System.OS.Shared.InterfaceLib FIG. 4C

PARAMETER MARSHALING TECHNIQUES FOR DYNAMIC OBJECT-ORIENTED PROGRAMMING LANGUAGES

FIELD OF THE INVENTION

The present invention is directed to computer operations, and more particularly to the manner in which different computer programs interact with one another to carry out certain operations.

BACKGROUND OF THE INVENTION

In the past, computer programs were typically written for specific computer platforms. For example, a program designed to operate on a Unix-based computer has its code written in accordance with the instruction set that is appropriate for that type of computer. When the program is to be run on the computer, it could be executed in one of two ways, namely compiled or interpreted, depending upon the particular language in which the program is written. For languages which employ compilers, such as C and C++, the compiling operation transforms the original source program into executable code that can be run on a specific computer architecture. The entire program is transformed, or compiled, prior to the time that any execution of the program takes place. In other words, the compiled program is in a state which enables each instruction to be readily executed at run time by the particular computer for which it has been compiled.

Other types of programming languages, such as BASIC, do not require the source program to be compiled prior to execution. Rather, programs written in these types of languages are interpreted during run time. In this type of operation, as each instruction is decoded, one of a number of possible actions is performed immediately, by a program known as an interpreter. Although interpreted programs take longer to run than compiled programs, due to the fact that the instructions must be individually decoded and executed during run time, they offer the advantage that they can be platform-independent. More particularly, an interpreted program can be delivered to, and installed upon, a number of different computer systems in its original, source language. Each computer system can have its own interpreter, for converting the source code into executable machine code appropriate for that computer. Thus, each of the different computers can run the same program, even if they operate on different platforms. In contrast, however, once a program has been compiled, it can only be run on the computer platform for which it was compiled.

For this reason, as the use of computers continues to increase, and the desirability of sharing and distributing computer programs among multiple different types of computers also increases, interpreted computer languages have been gaining increasing popularity. One particular example of this phenomenon can be seen in the expanding use of the internet, via which millions of different computers can interact with one another. The individual users employ a variety of different types of computers, which have different operating platforms. In an environment such as this, it is not feasible to develop a program which can run on only one of these platforms. In such a case, the program would not be able to be shared by all of the various users. Conversely, it is not practical to write multiple versions of the same program for each of the different platforms. For this reason, therefore, platform-independent types of programming languages are utilized. To permit them to be platform independent, these languages employ an intermediate form of representation, known as interpreted bytecode. In general, original source code is first compiled into the bytecode representation. This bytecode representation is independent of any specific computer platform. When it is run on a particular computer, the code is executed by an interpreter that is specific to the computer. In essence, the interpreter reads the bytecodes and executes the appropriate operation indicated by each one. In this manner, a single program can be shared among users of a variety of different types of computers, all having different operating platforms.

There may be situations in which it is desirable to access functions in a computer which lie outside of the interpreted bytecode program. For example, the native operating system of a computer is typically in a compiled form. The operating system may offer various types of services and functions that can be utilized by an interpreted bytecode program that is downloaded over a network. For example, it may be desirable to access functions that are contained in a shared library, such as a dynamic-link linked library.

In the past, such an operation was accomplished by designing a custom type of interface, sometimes known as "glue code", for each native function to be called from the interpreted program. Since special code had to be written for every desirable native function, such an approach required a significant amount of work and did not offer much flexibility for adapting to new native functions.

It is one object of the present invention, therefore, to provide a procedure by which an interpreted bytecode program can directly access functions which reside outside of that program, such as those provided by the native compiled operating system of the computer, without having to use intermediate glue code. Such an objective is particularly desirable for functions which are provided by shared libraries that are dynamically linked during the run time of the computer.

Further along these lines, many programs are being written with the use of object-oriented programming languages. In a pure object-oriented language, functions do not exist by themselves. Rather, all operations take place within objects, that are defined by classes. Thus, in a pure object-oriented program, every function belongs to a particular class. A function, or method as it is often termed, is invoked upon an instance of the class, or in the case of class methods, on the class itself.

In some situations, it may be desirable to employ services outside of those explicitly provided by an object-oriented program. However, in order for the program to employ those services, they must reside in a recognized class of objects. Hence, it is another objective of the present invention to provide a mechanism via which functions in a non-object-oriented environment, which lie outside of recognized classes, can be utilized by an object-oriented program, and vice versa.

SUMMARY OF THE INVENTION

A mechanism is provided for dynamically binding native methods in a run-time system to functions that are contained in compiled code, such as a dynamic-link library. In one embodiment, the shared functions are identified by a particular package of classes for an object-oriented language. When a native method is to be resolved during loading of a class, the name of the package is examined to see if the method resides in a shared library. If so, it is loaded using techniques that are specific to the compiled code in which the library exists.

In another embodiment, a designated base class, or interface, is used to identify the mechanism to be employed for dynamically linking to a library or other function. Once the mechanism is determined, the desired shared libraries are identified and loaded. In a third embodiment, a method is established which asks a class which libraries it needs to be linked to, as it is being loaded. The libraries are then loaded as well.

When a method implemented in the compiled code is called from a bytecode interpreted program, the parameters associated with that method are marshaled, i.e. converted from the format used by the interpreted code into one which is appropriate for the compiled code. In accordance with the invention, the marshaling of parameters is carried out in dependence upon the particular type of object with which the parameters are associated. In one particular instance, objects can be classified into two main types, aggregate objects and arrays. When an aggregate object is marshaled, a pointer to the object is adjusted to point directly to variables for an instance of that object. An array, on the other hand, has additional data which describes various attributes of its elements. When an array is marshaled, the pointer is adjusted to point to its individual elements.

The foregoing features of the invention are explained in greater detail hereinafter, with reference to specific examples illustrated in the accompanying figures.

DETAILED DESCRIPTION

To facilitate an understanding of the present invention, it is described hereinafter with reference to specific examples associated with aspects of the Java programming language, which is an object-oriented language designed for use on the internet and other multi-platform computer systems. It will be appreciated, however, that the principles of the invention are not limited to this particular language. Rather, they are generally applicable to any type of programming environment which utilizes an intermediate form of representation, and/or which is based upon object-oriented programming.

Figure 1:
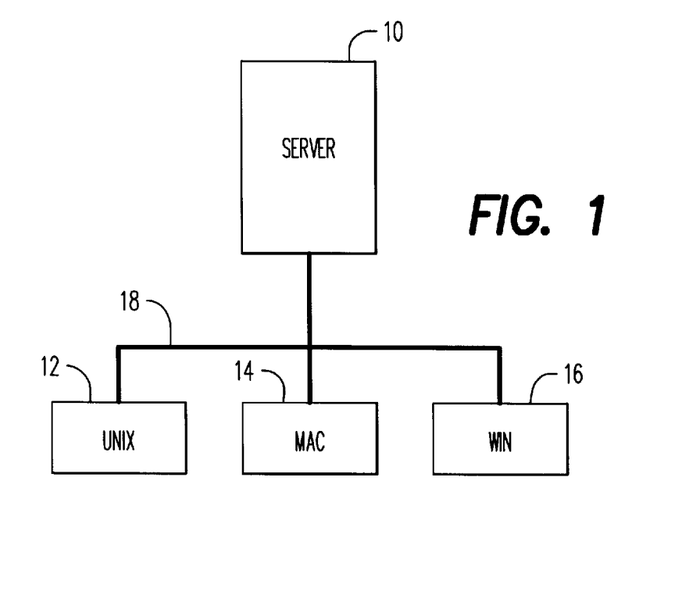
FIG. 1 is a general block diagram of a networked computer system in which the principles of the present invention can be employed.

As discussed previously, interpreted programs are gaining wider acceptance because they offer platform independence. FIG. 1 is a block diagram of a network system in which platform-independent programs can be employed to advantage. In this particular example, a server computer 10 is connected to a plurality of client computers 12–16 via a communications network 18. The network 18 could be a local area network, an enterprise-wide network or a larger international network, such as the internet. The client computers that are connected to the network could be of any of a variety of different types, and may run on different operating platforms. For example, one client 12 may run on the Unix operating system, another client 14 may be based upon the Apple Macintosh operating system, and a third client 16 might employ the Windows operating system.

In a system such as this, it may be desirable to download a program from the server 10 to each of the individual client computers. For example, the program may be an applet that is run by a distributed application, such as a web browser or the like. In this particular example, the three client computers 12–16 run on different operating systems, and therefore interact with the applet in different manners. It is possible, of course, to design a different version of the applet for each of the three operating systems. However, in a practical environment, in which large numbers of programs may need to be distributed to a variety of different computers, it is not feasible to write a different version of the program for each possible computer platform. Therefore, the program is written in a language that allows it to be distributed in a generic form, that can then run on each of the different platforms.

Figure 2:
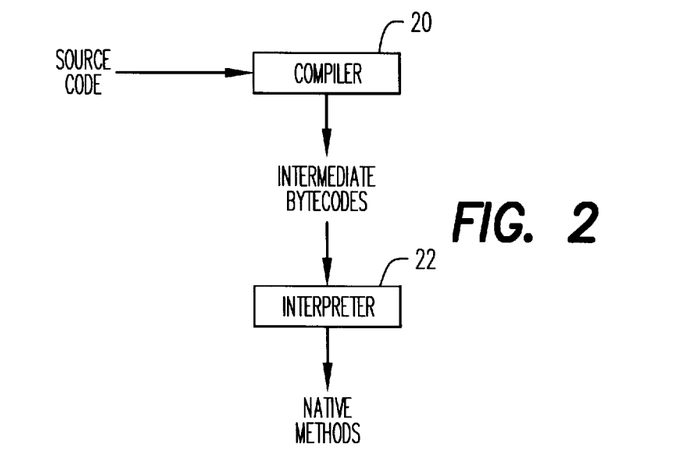
FIG. 2 is a flow diagram of the manner in which an interpreted bytecode program is executed.

FIG. 2 illustrates an example of the manner in which a platform-independent program operates. The source code for the program is written in a language that provides for such independence, such as Java, which is a pure object-oriented programming language. After the source code is completed, it is processed in a compiler 20, which transforms the source code into an intermediate representation that is generic to multiple types of operating platforms. For example, the intermediate form can be a bytecode representation, in which the different commands are represented by byte-sized codes. In this form, the program can be distributed over the network 18, to the various client computers 12–16, where it may be stored on a disk and/or loaded into working memory, i.e., RAM. Within the individual client computers, the bytecode representation of the program is executed by means of an interpreter 22. In essence, the interpreter is another program running in the computer which reads each bytecode, and interprets the actions that are necessary to perform the operation indicated by the bytecode. For example, if a bytecode represents an instruction to push a value onto a stack, the interpreter reads the next bytecode, which is the value to be pushed, and places it on the stack. In doing so, the interpreter may call methods that are provided by the native operating system for the computer. For this reason the interpreter is specific to the particular machine on which it is running. Thus, in the example of FIG. 1, the Unix client 12 runs one interpreter, for deciding how to interpret the bytecodes on the Unix operating system, the Macintosh client 14 has a different interpreter for calling Macintosh methods, and the Windows client 16 has yet another interpreter which is specific to its operating platform. With this approach, therefore, all three of the clients can be running the same program, even though they have differing operating platforms.

Within each client computer, a number of programs can be running at the same time. Some of these programs are likely to be compiled, rather than interpreted. For example, with reference to FIG. 3, a stand-alone application program 24, such as a word processor, might typically be a compiled program. This program interacts with the computer's operating system 26 to control the operations of the computer, provide a display output to the user, and receive keystrokes and cursor control input actions from the user. The operating system 26, which is typically also compiled, executes low-level instructions in response to requests from the application program 24. The operating system causes the various hardware elements to perform requested services, through individual device drivers 28.

Figure 3:
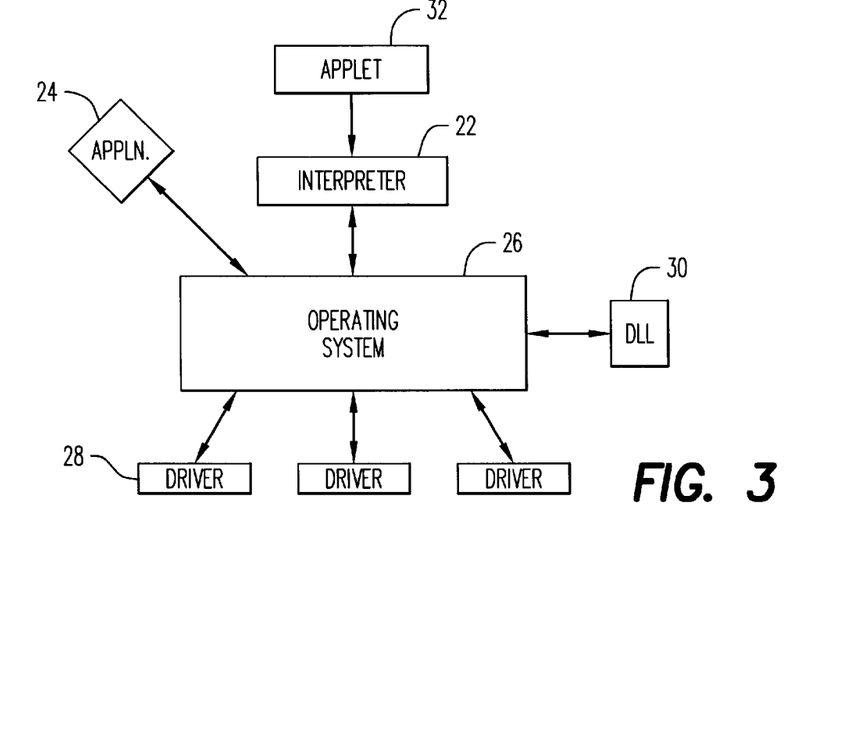
FIG. 3 is an architectural diagram of software components within a client computer.

The operating system 26 may include various resources that are shared with different application programs running on the computer. For example, associated with the Macintosh operating system is a set of system software routines know as a toolbox. Applications can employ services provided by the toolbox to carry out different user interface actions, such as the creation of menus, drawing of windows, and tracking of mouse movement as the user manipulates display objects. The services provided by the toolbox are contained in a shared library, such as a dynamic-link library 30. This library forms part of the compiled code associated with the operating system 26. In order for an application program to employ the services provided by the library, the library must be loaded into working memory and the application program must know how to access it, i.e. it must be linked to the library.

In operation, it may be desirable for an applet 32 or other program that is written in an object-oriented language and executed in the form of interpreted bytecode to employ some of the functions provided by the dynamic-link library 30. Since they exist as part of the compiled code, these functions lie outside of the classes defined within the applet. A function, or method, of this type is referred to as a "native method", to identify the fact that it is associated with the native operating system of the host computer, or some other compiled code, rather than the object-oriented language in which the applet is written. In a situation such as this, there is a need to associate, or bind, the native method to the classes defined for the applet during the run time of the computer. More specifically, it is necessary to tell the interpreter 22 which shared library is to be employed for a particular operation.

In accordance with the present invention, a shared library, or other function associated with compiled code, is dynamically bound to methods within the object-oriented applet, or other program, by establishing a set of classes that are associated with shared functions. In pure object-oriented programs, every method, or operation, is associated with a defined class. The execution of a method is carried out by passing a message, which requests a particular action, to the object or class associated with that action. Thus, for an operation to be carried out, there must exist a class of objects to which messages requesting the operation can be passed.

Figure 4A:
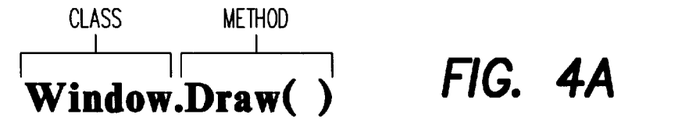
FIGS. 4A–4C are examples of names for class methods and packages.
Figure 4B:
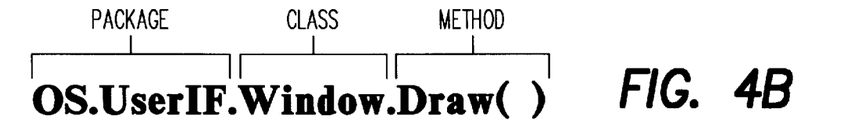

In an object-oriented program, the code is organized in a hierarchical manner, so that objects and classes inherit properties from classes which are above them in the hierarchy. The individual methods that are performed within a program can be identified by reference to their associated classes. Referring to FIG. 4A, for example, there may be a class of objects labeled "Window" and one of the methods performed by a window object is to draw a window on a display screen. The draw method can be identified with reference to its associated class, by using an identifier such as that shown in FIG. 4A, which contains both the name of the class and the name of the method. Related classes are typically named with common prefixes, to identify their hierarchical relationship. The related classes form a group known as a package. In this particular example, the Window class might be part of a package named "OS.UserIF", which could include other classes related to user interface objects. The fully qualified name for a method includes its package name, class name and method name, as shown in FIG. 4B. This naming convention permits the hierarchical relationship of different classes and methods to be identified, and establishes the line of inheritance for any given class and method.

Figure 4C:
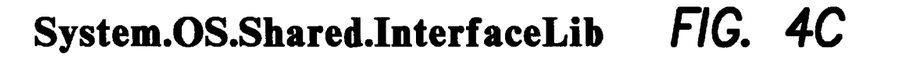

In accordance with the present invention, a mechanism is provided to identify native methods that lie outside of the object-oriented program itself. This mechanism is based upon the concept of inheritance in an object-oriented language, and is used to communicate to the run-time system which library is to be loaded for a particular class, and thereby resolve the issue of how to bind native methods to dynamic-link libraries. Several different approaches can be employed for any specific implementation of this inheritance directed linking mechanism, depending on the characteristics of the run-time system. In one approach, the library or libraries to be loaded for a class can be embedded in the name of the package for the class. A specific identifier is included within the package name to indicate the fact that native methods in a particular class are to be resolved by dynamically linking against a particular shared library. FIG. 4C illustrates an example of a package name which performs such a function. In this particular example, one element of the package name comprises the word "Shared". Following this term is the name of the particular shared library that is to be employed, i.e. InterfaceLib. In essence, this package name defines a data structure which contains the names of classes that are to be bound to the shared library during run time.

In another approach, a designated base class identifies the mechanism used to load the shared libraries. To this end, it may be preferable to employ an interface or abstract class, rather than a concrete base class per se, for this function. An interface is essentially an abstract class, and is not instantiated itself. Rather, its primary function is to guarantee that, if called, certain methods associated with that interface will be implemented. In this approach, the interface functions to identify the mechanism that is used to load the libraries. It does not identify the specific libraries themselves, however. Rather, that function is performed by a separate structure or statement. The following example of the interface approach in Java utilizes a static block to identify the libraries to load:

```
interface NativeObject {
}
class Rect implements NativeObject {
    native FrameRect ( );
    static {
        System.Load ("InterfaceLib");
        System.Load ("RectUtils");
    }
}
```

When the class Rect is loaded, the interface NativeObject indicates that the libraries are to be loaded with techniques that are specific to the native operating system. The static block which follows identifies two dynamically linked libraries that are to be loaded. As can be seen, a benefit associated with the use of an interface is the fact that several libraries can be loaded for a given class.

In yet another example of a mechanism for directly loading native functions, a method can be established to ask a class which libraries it needs to be linked to, as it is being loaded. An example of such a method is given below:

```
static String chooseLibrary(String methodName)
{
    if (MethodName = "foo")
        return "InterfaceLib";
    else
        return "OtherLib";
}
```

Again with this approach, the class can return a single library name or choose among several names, if appropriate.

Figure 5:
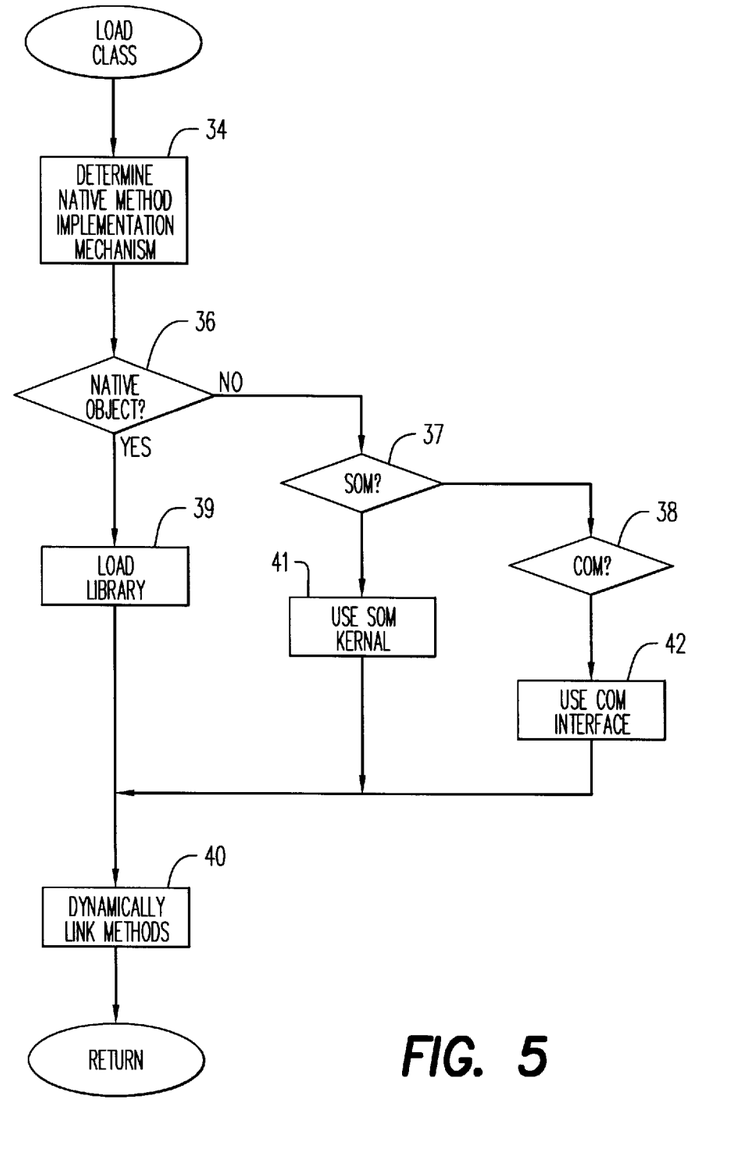
FIG. 5 is a flowchart of the procedure for loading a native library.

At run time for the object-oriented program, such as the applet 32, classes are loaded into the memory of the computer, as illustrated in the flow chart of FIG. 5. During class loading, the implementation mechanism for identifying the native method is first determined at Step 34. The mechanism could be any of the three examples described above, i.e. package name, base class or requesting method, or any other suitable approach. Once the mechanism is determined, the type of method to be loaded is identified at Steps 36–38. If the method resides in a native object, as identified at Step 36, the appropriate library is loaded at Step 39, using techniques that are specific to the particular operating platform of the computer. Thus, in the example described above with reference to FIG. 3, if the dynamic linked library 30 for the Macintosh toolbox is to be loaded, the object-oriented program sends a request to the operating system 26, which causes the library to be loaded at a particular address in memory. This address is then returned to the applet 32, after which it links itself to the library, at Step 40. Alternatively, if the native method resides in a SOM class, as determined at Step 37, the SOM kernel is invoked at Step 41. Once the library is loaded, the class being loaded links itself to the library at Step 40. Similarly, if the native method is part of a COM interface, as determined at Step 38, it is loaded from a COM interface at Step 42 and then linked at Step 40. By means of this simple mechanism, any shared library in the computer system can be made directly accessible to the applet, regardless of the fact that it resides in compiled code rather than the interpreted bytecode of the applet. As such, the need for glue code is avoided.

When a native method is called from within the applet, parameters for the requested function are converted from a format appropriate to the applet into one required by the native code. For example, in a language such as Java, all strings are composed of 2-byte characters. In the C programming language, however, characters are single-byte values, and are null terminated. Accordingly, when a parameter is passed from an object in Java to a method in C, it must be translated into the appropriate data type. Once the data type is translated, the parameter can then be passed on to the native method. This process of translating the format of the parameters, when calling a native method, it known as "marshaling". The data type conversion itself can be carried out in a straightforward manner, for example with reference to a lookup table.

In an object-oriented program, the passing of parameters to internal methods is handled in two different manners, depending upon the type of parameter. Primitive data types, such as integers and floating point numbers, are handled by value. In other words, the actual values of the primitives are stored in variables and passed to methods. In contrast, objects and arrays are handled by reference. When an object is the parameter to a method, the object itself is not provided to the method. Rather, a reference, such as an address or pointer, is stored as a value, which is then passed on to the method. The same holds true for arrays.

When a native method is called directly from the object-oriented program pursuant to the foregoing features of the invention, the called method may not know how to deal with a reference to an object. Therefore, in accordance with another aspect of the present invention, the information provided to the native method is appropriately converted during the marshaling process.

Figure 6:
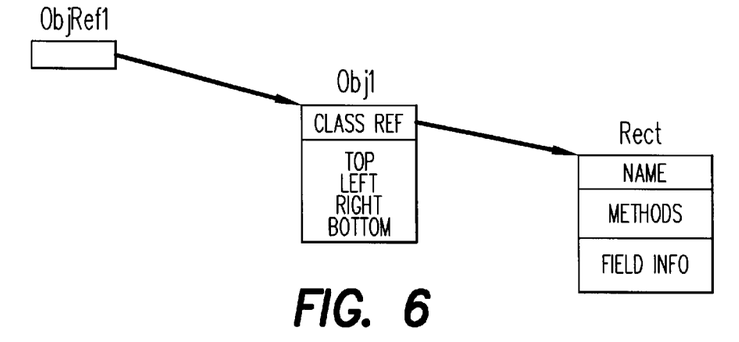
FIGS. 6, 6A and 6B illustrate examples of the passing of an object parameter to a method.

More particularly, since primitive data types are handled within the object-oriented program by value, they can be similarly passed in the same state to a native method. For referenced data, however, such as objects and arrays, further processing of the parameters must be carried out, before they are passed on to the native method. FIG. 6 illustrates an example of a class named Rect, which is used to draw rectangles. This class has certain methods associated with it, and data fields that are used to define a particular rectangle to be drawn. In this particular instance, the four fields are labeled "top", "left", "right" and "bottom". An instantiation of the class forms an object, Obj1, whose elements comprise a reference to the class definition for Rect, followed by data values for the four fields. A reference to this object, ObjRef1, is stored in the memory of the computer.

Figure 6A:
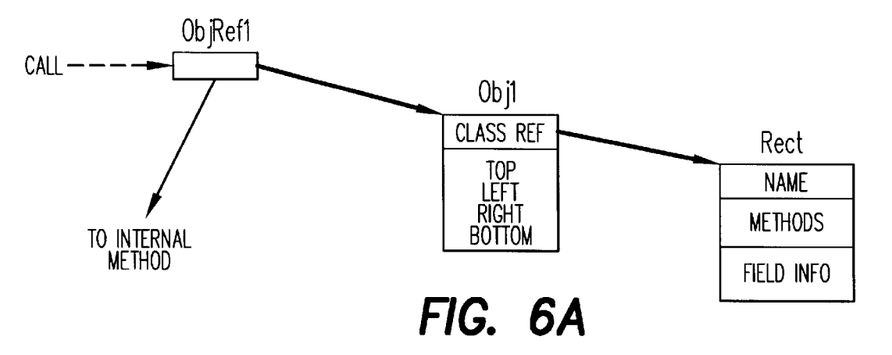

Within the object-oriented applet, whenever a call is made to a method in which the object Obj1 constitutes a parameter that is passed on to the method as part of the call, the actual data that is provided comprises the reference ObjRef1, as depicted in FIG. 6A. From this information, a method within the object-oriented program can obtain the data needed to carry out the method, such as the values needed to draw a rectangle. When the object is passed as a parameter to a native method, however, the information must be modified so that it identifies a value that the native method can operate upon. For example, a native method might be expecting to receive only the four parameter values that define the rectangle, and would thus interpret the first-received value as the "top" value. As a result of the reference to the object Obj1, however, the first value it will read is actually the reference to the class definition. In such a case, the result of the method will not be what is expected, e.g. a rectangle might be drawn with the wrong size, and in the wrong place.

Figure 6B:
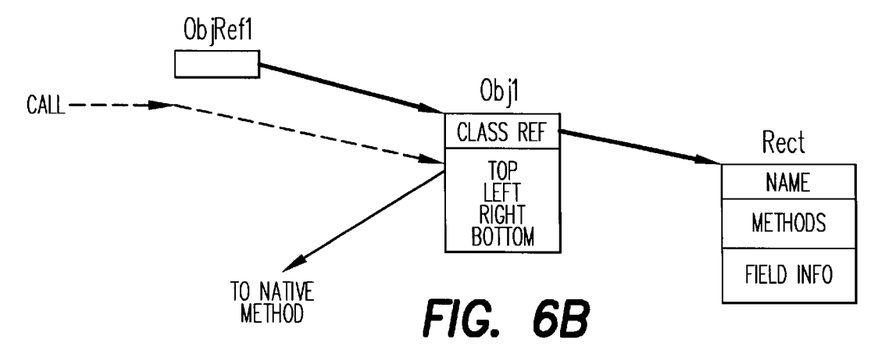

In accordance with the present invention, a determination is first made whether a parameter to be marshaled for a native method is a value or a reference to an object. If the parameter is a value, it is marshaled in the normal manner and passed on to the native method. When the parameter is an object, however, an adjusted reference is computed which points past the object itself, and directly to the first instance variable. Thus, in the example of FIG. 6B, the object Obj1 identified by the reference ObjRef1 is examined, to determine the location of the four instance variables for the object. A pointer which points directly to the memory location for the first instance variable, "top", is then provided as the adjusted parameter to the native method. If needed, these data values can further undergo a conventional marshaling process, to convert them into a format that is appropriate to the native method.

Figure 7:
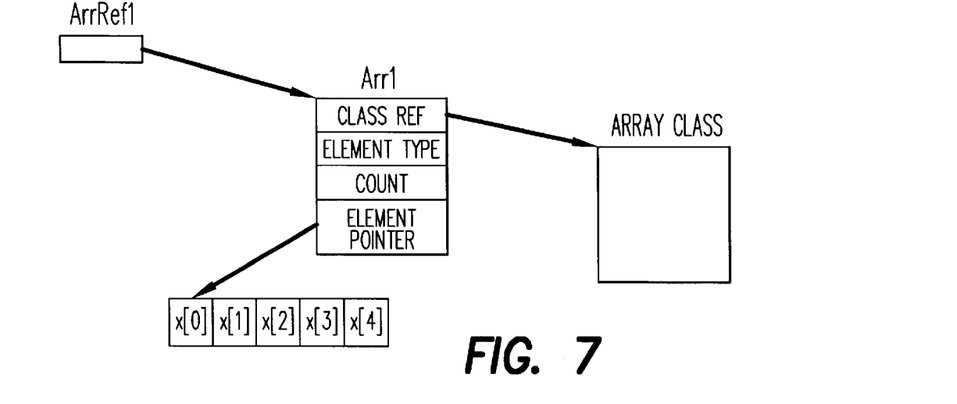
FIGS. 7, 7A and 7B illustrate examples of the passing of an array parameter to a method.

When the parameter to be passed to a native method is an array, rather than an individual object, a different set of information is provided. As shown in FIG. 7, an array has the same structure as an object, with two additional items of data, which can be used to distinguish an array from an object. In addition to a reference to its class definition, the instantiation of an array includes the data type of its elements and its length, i.e., the number of elements in it. Referring to FIG. 7, a five-element array Arr1 points to a contiguous section of memory that holds the values of each of its individual elements, in this case x[0] through x[4]. An array reference ArrRef1 points to this array instantiation.

Figure 7A:
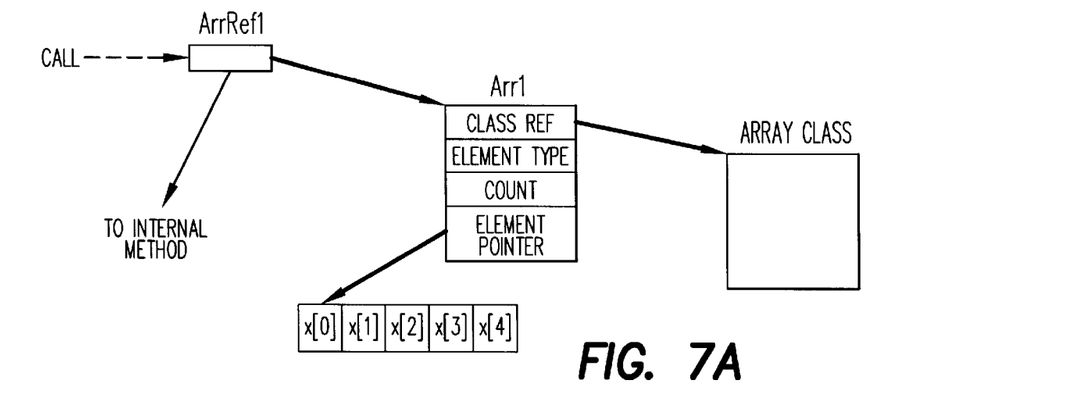
Figure 7B:
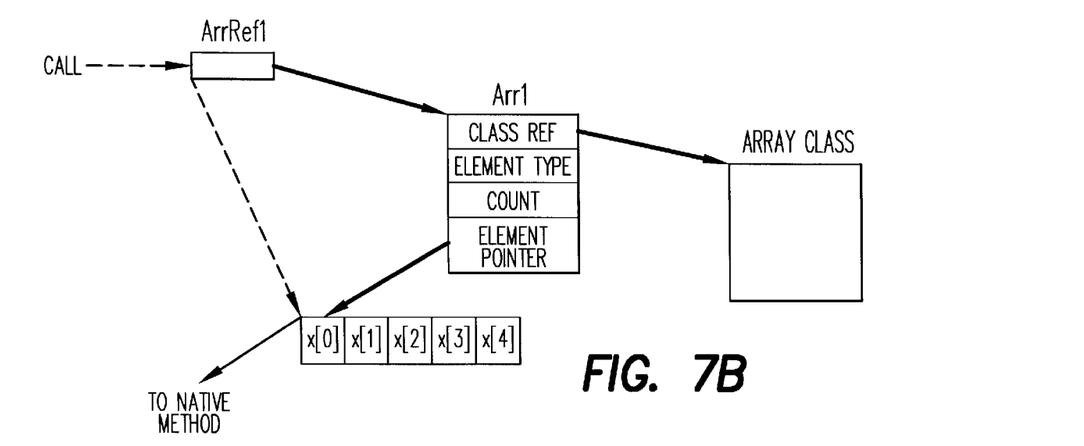

In operation, when an array is to be passed as a parameter to an internal method, i.e. one which occurs within the object-oriented program, the method is provided with the reference to the array, i.e. ArrRef1, as shown in FIG. 7A. When the initial examination of the parameter reveals that an array is to be provided as a parameter to a native method, rather than a primitive value or an object reference, the parameter is again modified, as with object references. In this case, the reference to the array is modified to point to the address of the array elements, as illustrated in FIG. 7B.

Another operation that must be considered when an interpreted bytecode program interacts with other programming paradigms is the manner in which exceptions, or errors, are handled. In the interpreted bytecode program, exceptions are handled in an active manner by the method which was called. More particularly, if an exception occurs during the execution of a method, the method performs an operation that is known as "throwing" the exception. In essence, the throwing of an exception functions as a general notice to the program that an error condition has occurred. In response, other parts of the program may try to catch, i.e. handle, the error, thereby avoiding the need to interrupt or terminate the running of the program.

Other programming paradigms may not use this active approach to the handling of exceptions. For example, programs based on SOM techniques employ a mechanism in which the calling object, rather than the called method, detects and handles the exception. Specifically, when a SOM method is called, it requires a pointer to a particular data structure known as an Environment. When the method returns, after conducting the requested operation, the contents of the Environment data structure are examined by the calling object, to determine whether an exception has occurred. It can be seen that, if a SOM method is called as a native method by an interpreted bytecode application, such as an applet, exceptions would not be properly handled within the applet, since they are not "thrown" by the method.

Figure 8A:
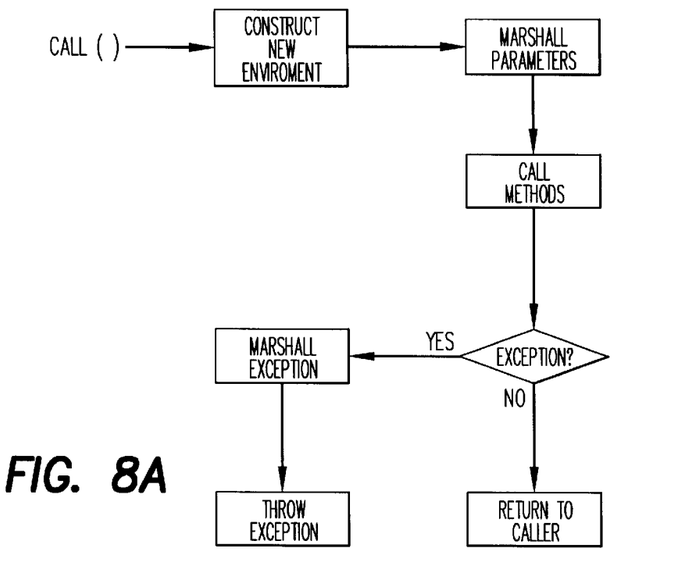
FIGS. 8A and 8B illustrate the handling of an exception generated during execution of a SOM method.
Figure 8B:
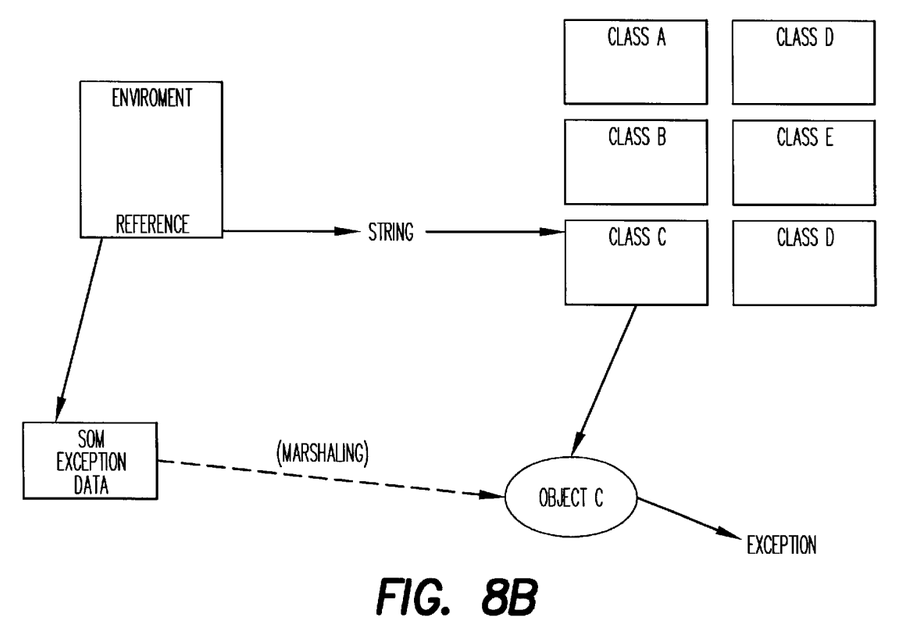

In accordance with a further aspect of the invention, the parameter marshaling techniques are extended to cover such a situation. Referring to the flowchart of FIG. 8A, when a SOM method, or other such method with similar functionality, is to be employed, a new data structure, such as the Environment structure, is constructed, the necessary parameters are marshaled, and the method is called. When the called method returns, the data structure is examined to see if an exception value is contained within the data structure, for example by checking to see whether it contains a pointer to an exception object. If not, the appropriate return is made to the caller. However, if there is an exception, it is labeled with a string that indicates the type of exception which has occurred, as shown in FIG. 8B. For each type of exception, a class is defined in the object-oriented program which has a correspondence to the SOM exception data. In the example of FIG. 8B, these SOM exception classes are labeled ClassA-ClassE. The string is used to identify the corresponding class, in this case ClassC, and allocate an instance of the class, namely ObjectC. The SOM exception data is marshaled and copied from the SOM exception object into the class object, which then throws a recognizable exception. With this approach, a SOM object can be used in the same manner as any other object within the applet.

From the foregoing, it can be seen that the present invention provides a mechanism for handling the exchange of information between an object-oriented, run-time interpreted program and other programs, such as native compiled programs. With this mechanism, resources which are available outside of the object-oriented program can be directly accessed from within the program, to thereby take advantage of the faster processing times that are inherent to compiled functions and avoid the need to replicate those functions in the program.

It will be appreciated by those of ordinary skill in the art that the present invention can be embodied in other specific forms without departing from the spirit or essential characteristics thereof. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. In a computer which executes a program written in a first, object-oriented program language, a system for marshaling object parameters for executing a method in an other program written in a second program language, comprising:

means for calling a method in said other program and passing a parameter to said method;

means for determining if said parameter is a reference to a first type of object comprising a reference to a class definition and one or more instance variables;

means responsive to a determination that said parameter is a reference to said first type of object, for adjusting said reference to point to said instance variables and for passing the adjusted reference to said method as the parameter;

means for determining if said parameter is a reference to a second type of object comprising a reference to a class definition and an array of elements; and means responsive to a determination that said parameter is a reference to said second type of object, for adjusting said reference to point to said elements in said array and for passing the adjusted reference to said method as the parameter.

2. In a computer which executes a program written in a first, object-oriented program language, a system for marshaling object parameters for executing a method in an other program written in a second program language, comprising:

means for calling a method in said other program and passing a parameter to said method;

means for determining if said parameter is a reference to a predetermined type of object comprising a reference to a class definition and one or more instance variables; and means responsive to a determination that said parameter is a reference to said predetermined type of object, for adjusting said reference to point to said instance variables and for passing the adjusted reference to said method as the parameter.

3. In a computer which executes a program written in a first, object-oriented program language, a system for marshaling object parameters for executing a method in an other program written in a second program language, comprising:

means for calling a method in said other program and passing a parameter to said method;

means for determining if said parameter is a reference to a predetermined type of object comprising a reference to a class definition and an array of elements; and means responsive to a determination that said parameter is a reference to said predetermined type of object, for adjusting said reference to point to said elements in said array and for passing the adjusted reference to said method as the parameter.

4. A computer-executed method for marshaling parameters prior to the execution of a native method in a computer, comprising the steps of:

determining whether a parameter is an object;

if the parameter is an object, detecting whether the object is of a first type or a second type, in which the second type of object includes an array of elements;

adjusting a reference to the object to refer directly to instance variables of the object when the object is detected to be of the first type;

adjusting the reference to refer to the elements of the array for the object when the object is detected to be of the second type; and passing the adjusted reference to the native method.

5. A computer-executed method for marshaling parameters prior to the execution of a native method in a computer, comprising the steps of:

calling a native method and obtaining a parameter to be passed to the native method;

determining whether the parameter is a value or a reference to an object which contains data in addition to values;

if the parameter is determined to be a reference to an object, adjusting said reference to refer directly to values of the object; and passing the adjusted reference to the native method as the parameter.

6. The method of claim 5 wherein said object includes an array of elements, and wherein the adjusted reference refers directly to elements of the array.

7. In a computer, a system for marshaling parameters for executing a method, comprising:

means for calling a method and passing a parameter to said method;

means for determining if said parameter is a reference to a first type of object comprising an identification and one or more data items;

means responsive to a determination that said parameter is a reference to said first type of object, for adjusting said reference to point to said data items and for passing the adjusted reference to said method as the parameter;

means for determining if said parameter is a reference to a second type of object comprising an identification and an array of elements; and means responsive to a determination that said parameter is a reference to said second type of object, for adjusting said reference to point to said elements in said array and for passing the adjusted reference to said method as the parameter.

8. The system of claim 7 wherein said identification for at least one of said types of objects comprises a reference to a class definition.

9. The system of claim 7 wherein said data items comprise instance variables for the object.

10. In a computer, a system for marshaling object parameters for executing a method, comprising:

means for calling a method and passing a parameter to said method;

means for determining if said parameter is a reference to a predetermined type of object comprising an identification and one or more data items; and means responsive to a determination that said parameter is a reference to said predetermined type of object, for adjusting said reference to point to said data items and for passing the adjusted reference to said method as the parameter.

11. The system of claim 10 wherein said identification comprises a reference to a class definition.

12. The system of claim 10 wherein said data items comprise instance variables for the object.

13. In a computer, a system for marshaling object parameters for executing a method, comprising:

means for calling a method and passing a parameter to said method;

means for determining if said parameter is a reference to a predetermined type of object comprising an identification and an array of elements; and means responsive to a determination that said parameter is a reference to said predetermined type of object, for adjusting said reference to point to said elements in said array and for passing the adjusted reference to said method as the parameter.

14. The system of claim 13 wherein said identification comprises a reference to a class definition.

15. A computer-readable medium containing a computer program which executes the following steps:

determining whether a parameter to be passed to a computer-implemented method is an object;

if the parameter is an object, detecting whether the object is of a first type or a second type, in which the second type of object includes an array of elements;

adjusting a reference to the object to refer directly to instance variables of the object when the object is detected to be of the first type;

adjusting the reference to refer to the elements of the array for the object when the object is detected to be of the second type; and passing the adjusted reference to the method.

16. A computer-readable medium containing a computer program which executes the following steps:

calling a computer-implemented method and obtaining a parameter to be passed to the method;

determining whether the parameter is a value or a reference to an object which contains data in addition to values;

if the parameter is determined to be a reference to an object, adjusting said reference to refer directly to values of the object; and passing the adjusted reference to the method as the parameter.

* * * * *